(12) United States Patent
El-Khamy et al.

(10) Patent No.: US 11,861,859 B2
(45) Date of Patent: Jan. 2, 2024

(54) SYSTEM AND METHOD FOR DISPARITY ESTIMATION BASED ON COST-VOLUME ATTENTION

(71) Applicant: Samsung Electronics Co., Ltd., Gyeonggi-do (KR)

(72) Inventors: Mostafa El-Khamy, San Diego, CA (US); Jungwon Lee, San Diego, CA (US); Haoyu Ren, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 187 days.

(21) Appl. No.: 17/131,129

(22) Filed: Dec. 22, 2020

(65) Prior Publication Data

US 2022/0051426 A1 Feb. 17, 2022

Related U.S. Application Data

(60) Provisional application No. 63/092,850, filed on Oct. 16, 2020, provisional application No. 63/083,345, filed on Sep. 25, 2020, provisional application No. 63/065,783, filed on Aug. 14, 2020.

(51) Int. Cl.
*G06T 7/593* (2017.01)
*H04N 13/239* (2018.01)
*H04N 13/00* (2018.01)

(52) U.S. Cl.
CPC .... *G06T 7/593* (2017.01); *G06T 2207/20021* (2013.01); *G06T 2207/20081* (2013.01); *H04N 13/239* (2018.05); *H04N 2013/0081* (2013.01)

(58) Field of Classification Search
None
See application file for complete search history.

(56) References Cited

U.S. PATENT DOCUMENTS

| | | | |
|---|---|---|---|
| 8,385,630 B2 | 2/2013 | Sizintsev et al. | |
| 9,390,508 B2 | 6/2016 | Ukil et al. | |
| 9,524,556 B2 | 12/2016 | Uliyar et al. | |
| 9,542,750 B2 | 1/2017 | Muninder et al. | |
| 9,626,590 B2 | 4/2017 | Najafi Shoushtari et al. | |
| 9,967,516 B2 | 5/2018 | Chang et al. | |
| 10,321,112 B2 | 6/2019 | Aflalo et al. | |
| 10,380,753 B1 * | 8/2019 | Csordás | G06V 10/82 |

(Continued)

OTHER PUBLICATIONS

H. - J. S. Kim, S. -M. Choi and S. Chi, "Depth Attention Net," 2019 International Conference on Information and Communication Technology Convergence (ICTC), 2019, pp. 1110-1112, doi: 10.1109/ICTC46691.2019.8939688. (Year: 2019).*

(Continued)

*Primary Examiner* — Jiangeng Sun
(74) *Attorney, Agent, or Firm* — The Farrell Law Firm, P.C.

(57) ABSTRACT

Method and systems are provided for robust disparity estimation based on cost-volume attention. A method includes extracting first feature maps from left images captured by a first camera; extracting second feature maps from right images captured by a second camera; calculating a matching cost based on a comparison of the first and second feature maps to generate a cost volume; generating an attention-aware cost volume from the generated cost volume; and aggregating the attention-aware cost volume to generate an output disparity.

19 Claims, 13 Drawing Sheets

(56) References Cited

U.S. PATENT DOCUMENTS

| | | | |
|---|---|---|---|
| 2014/0219549 | A1 | 8/2014 | Choi et al. |
| 2015/0248769 | A1* | 9/2015 | Ukil .................. G06T 7/593 382/154 |
| 2016/0014387 | A1* | 1/2016 | Baik .................. G06T 7/97 348/51 |
| 2019/0080464 | A1 | 3/2019 | Lee et al. |
| 2020/0084427 | A1 | 3/2020 | Sun et al. |
| 2020/0160533 | A1 | 5/2020 | Du et al. |
| 2020/0193623 | A1 | 6/2020 | Liu et al. |
| 2020/0273192 | A1* | 8/2020 | Cheng .................. G06T 7/593 |
| 2020/0302627 | A1 | 9/2020 | Duggal et al. |

OTHER PUBLICATIONS

Y. Zhang, Y. Li, Y. Kong and B. Liu, "Attention Aggregation Encoder-Decoder Network Framework for Stereo Matching," in IEEE Signal Processing Letters, vol. 27, pp. 760-764, 2020, doi: 10.1109/LSP.2020.2993776. (Year: 2020).*

G. Zhang, D. Zhu, W. Shi, X. Ye, J. Li and X. Zhang, "Multi-Dimensional Residual Dense Attention Network for Stereo Matching," in IEEE Access, vol. 7, pp. 51681-51690, 2019, doi: 10.1109/ACCESS.2019.2911618. (Year: 2019).*

S. Jeong, S. Kim, B. Ham and K. Sohn, "Convolutional cost aggregation for robust stereo matching," 2017 IEEE International Conference on Image Processing (ICIP), 2017, pp. 2523-2527, doi: 10.1109/ICIP.2017.8296737. (Year: 2017).*

Yang et al., "Multi-Attention Network for Stereo Matching," IEEE Access ( vol. 8), pp. 113371-113382, Jun. 18, 2020.

Yu et al., "Deep Stereo Matching with Explicit Cost Aggregation Sub-Architecture," Computer Vision and Pattern Recognition, pp. 30-40, Jan. 12, 2018.

Ma et al., "Accurate Dense Stereo Matching Based on Image Segmentation Using an Adaptive Multi-Cost Approach," Symmetry 2016, 8(12), pp. 1-22, Dec. 21, 2016.

Sang et al., "Multi-Scale Context Attention Network for Stereo Matching," IEEE Access ( vol. 7), pp. 15152-15161, Jan. 31, 2019.

Thanh-Sach Le et al., "A New Coarse-To-Fine Method for Computing Disparity Images by Sampling Disparity Spaces," IEEJ Transactions on Electronics Information and Systems 129(1), pp. 103-111, Jan. 2009.

Wang et al., "Learning Parallax Attention for Stereo Image Super-Resolution," 2019 IEEE/CVF Conference on Computer Vision and Pattern Recognition (CVPR), pp. 12250-12259, Jun. 15-20, 2019.

Zhang et al., "GA-Net: Guided Aggregation Net for End-to-end Stereo Matching," Proceedings of the IEEE Conference on Computer Vision and Pattern Recognition (CVPR), Apr. 13, 2019.

Du et al., "Amnet: Deep atrous multiscale stereo disparity estimation networks," International Conference on Consumer Electronics, Apr. 19, 2019.

Fu et al. "Dual attention network for scene segmentation," Proceedings of the IEEE Conference on Computer Vision and Pattern Recognition. Apr. 21, 2019.

* cited by examiner (a) CVA-SBDA: single-branch disparity attention on the cost volume (b) CVA-SBCA: single-branch channel attention on the cost volume (c) CVA-SBCDCA: single-branch combined disparity-channel attention on the cost volume

SYSTEM AND METHOD FOR DISPARITY ESTIMATION BASED ON COST-VOLUME ATTENTION

PRIORITY

This application is based on and claims priority under 35 U.S.C. § 119(e) to U.S. Provisional Patent Application Ser. No. 63/092,850, which was filed on Oct. 16, 2020, to U.S. Provisional Patent Application Ser. No. 63/083,345, which was filed on Sep. 25, 2020, and to U.S. Provisional Patent Application Ser. No. 63/065,783, which was filed on Aug. 14, 2020, the entire content of each of which is incorporated herein by reference.

FIELD

The present disclosure relates generally to estimation of real world disparity of elements in a scene captured by two cameras, and more particularly, to a deep learning system and method for robust disparity estimation based on cost-volume attention.

BACKGROUND

Deep learning is now leading many performance breakthroughs in various computer vision tasks. The state-of-the-art performance of deep learning came with over-parameterized deep neural networks, which enable extracting useful representations (features) of the data automatically for a target task when trained on a very large dataset.

There is also interest in the estimation of the real world depth of elements in a captured scene, which has many applications such as the capability of separating foreground (close) objects from background (far) objects within the captured scene. Accurate disparity estimation allows separation of the foreground objects of interest from the background in a scene. Further, accurate foreground-background separation allows for processing captured images to emulate effects such as the Bokeh effect. The Bokeh is a soft out-of-focus blur of the background, which is effective when using the correct settings in expensive cameras with fast lenses, and wide apertures, as well as moving the cameras closer to the subject and the subject further away from the background to emulate a shallow depth-of-field. Therefore, accurate disparity estimation allows for processing images from non-professional photographers or cameras with smaller lenses (such as mobile phone cameras) to obtain more aesthetically pleasing images with the Bokeh effect applied to the captured subject. Other applications of accurate disparity estimation include three dimensional (3D) object reconstruction and virtual reality applications, where it is desired to change the background or the subject and render them according to the desired virtual reality.

However, real-world scenarios are very complicated, and consist of scenes with various diverse patterns, such as indoor versus street view driving. As such, the existing disparity estimation methods do not work very well as they are only optimized for limited scenarios. Further, they require multiple models to deal with the disparity estimation in different real-world environments.

SUMMARY

The present disclosure is provided to address at least the problems and/or disadvantages described above and to provide at least the advantages described below.

An aspect of the disclosure is to provide a system and method for estimation of real world disparity of elements in a scene captured by two cameras, using a single model that works well for scenes with various patterns.

Another aspect of the disclosure is to provide a deep learning system and method for robust disparity estimation based on cost-volume attention.

Another aspect of the disclosure is to provide a system and method for disparity estimation based on cost-volume attention, which can handle real-world disparity estimation problems using a single model.

According to one embodiment, a method is provided, which includes extracting first feature maps from left images captured by a first camera; extracting second feature maps from right images captured by a second camera; calculating a matching cost based on a comparison of the first and second feature maps to generate a cost volume; generating an attention-aware cost volume from the generated cost volume; and aggregating the attention-aware cost volume to generate an output disparity.

According to one embodiment, a system is provided, which includes a memory and a processor configured to extract first feature maps from left images captured by a first camera, extract second feature maps from right images captured by a second camera, calculate a matching cost based on a comparison of the first and second feature maps to generate a cost volume, generate an attention-aware cost volume from the generated cost volume, and aggregate the attention-aware cost volume to generate an output disparity.

According to one embodiment, a system is provided, which includes a feature extraction module configured to extract first feature maps from left images captured by a first camera, and extract second feature maps from right images captured by a second camera; a cost volume calculation module configured to calculate a matching cost based on a comparison of the first and second feature maps to generate a cost volume; a cost volume attention module configured to generate an attention-aware cost volume from the generated cost volume; and a cost aggregation module configured to aggregate the attention-aware cost volume to generate an output disparity.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
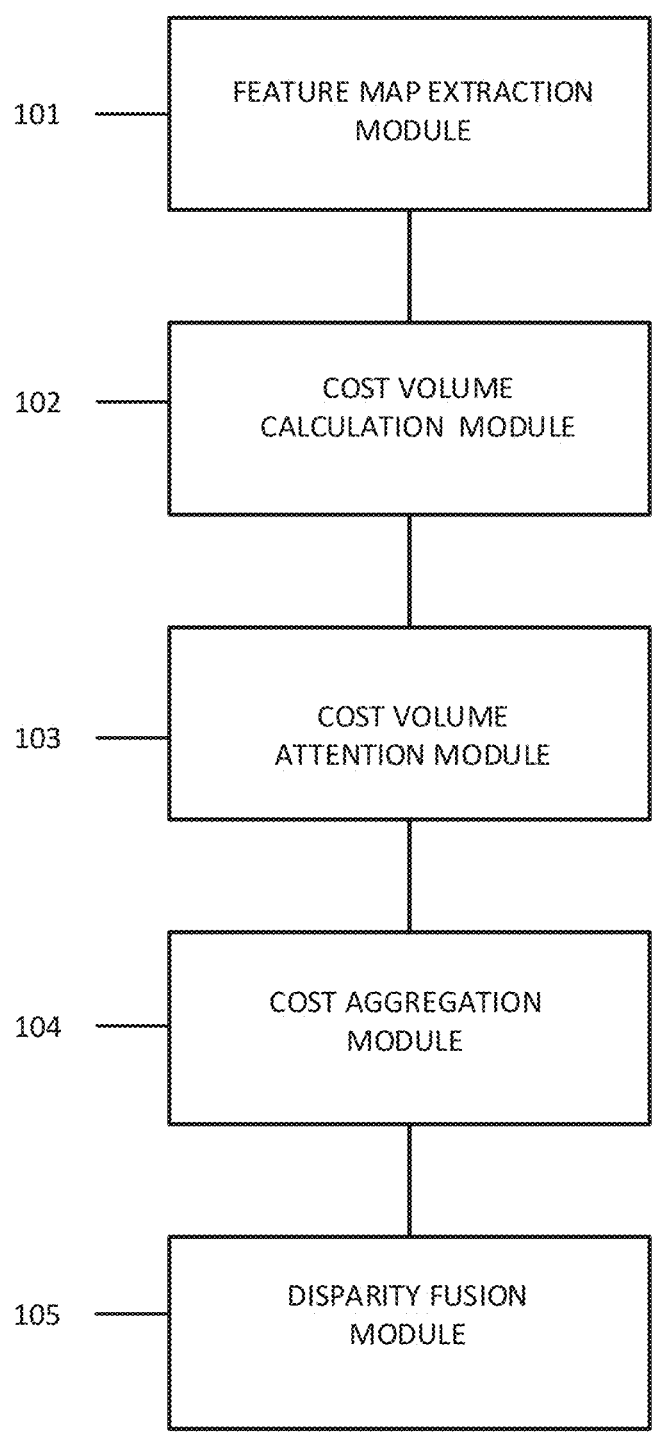
FIG. 1 illustrates a deep learning system for robust disparity estimation based on cost-volume attention, according to an embodiment.

Hereinafter, embodiments of the disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

Conventional disparity estimation methods focus only on estimating disparity from a specific domain, such as for indoor scenarios only, or for street view only. Accordingly, when testing on a different scenario using a conventional method, accuracy may be very bad.

FIG. 1 illustrates a deep learning system for robust disparity estimation based on cost-volume attention, according to an embodiment.

Referring to FIG. 1, the deep learning system includes a feature map extraction module 101, a cost volume calculation module 102, a cost volume attention (CVA) module 103, a cost aggregation module 104, and a disparity fusion module 105. The feature extraction module 101 extracts feature maps from left and right images. The cost volume calculation module 102 calculates a matching cost based on the left/right feature maps. The CVA module 103 adjusts (emphasizes/suppresses) portions of the cost volume based on attention, providing different weights for different disparities in the cost volume. The cost aggregation module 104 aggregates the attention-aware cost volume to output a disparity. The disparity fusion module 105 fuses two aggregated disparities (e.g., trained on different disparity ranges) to provide a final output disparity.

Although FIG. 1 illustrates each module as a separate element, the modules may be included in a single element such as a processor or an ASIC.

Figure 2:
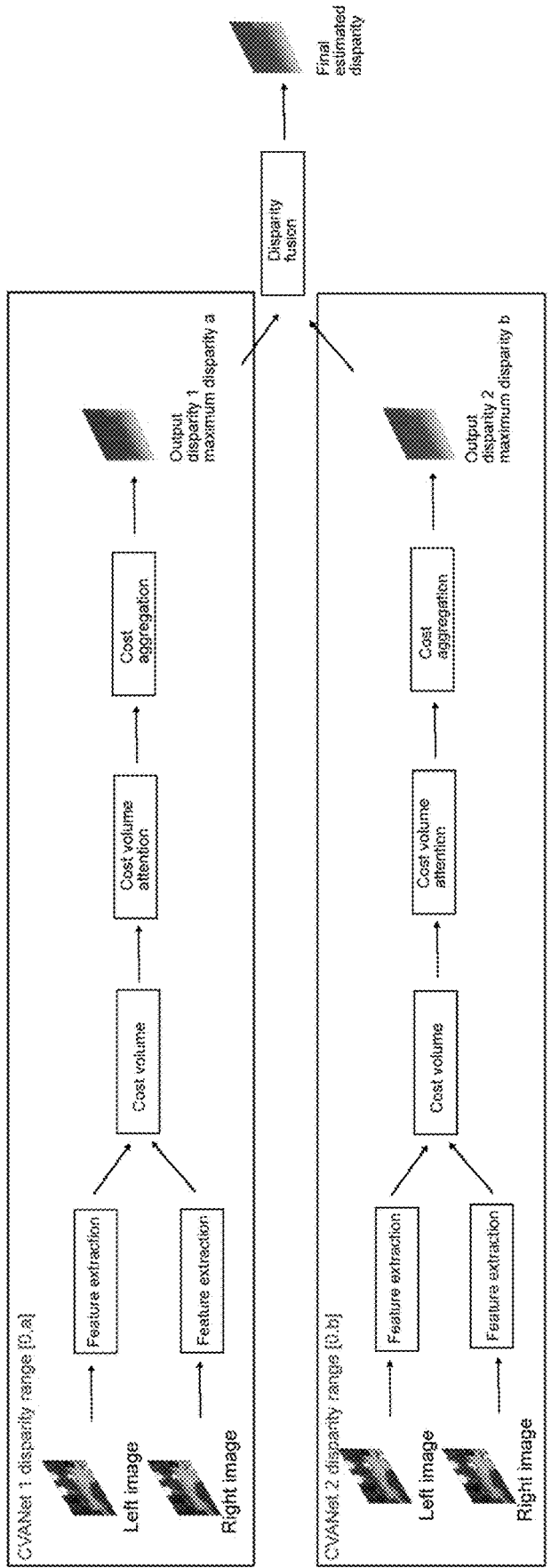
FIG. 2 illustrates a process of generating a final output disparity by a deep learning system, according to an embodiment.

FIG. 2 illustrates a process of generating a final output disparity by a deep learning system, according to an embodiment. Specifically, FIG. 2 illustrates a process of deep learning system, which works well for various scenarios by using single model, based on CVA. Herein, the system may be referred to as CVANet. For example, the process illustrated in FIG. 2 may be performed by the deep learning system illustrated in FIG. 1.

Referring to FIG. 2, a disparity fusion scheme is provided, based on two networks trained on different disparity ranges. A first network is optimized on a partial disparity range [0, a], and a second network is optimized on a full disparity range [0, b], where b>a. The feature extraction modules, cost volume calculation modules, CVA modules, and cost aggregation modules may be the same for the two disparity estimation networks of different disparity ranges.

In both networks, the feature extraction module extracts feature maps from left and right images. Thereafter, the cost volume calculation module calculates a matching cost between the left/right feature maps. The output is a cost volume, which represents the matching cost between the left and right feature maps at every disparity level. In the ideal case, the matching cost of the true disparity level will be 0.

The CVA module revises the cost volume based on the attention technology, which provides different weights for different disparities in the cost volume. For different scenarios, this attention module will focus on different parts of cost-volume. For example, if it is an outdoor scenario, the attention module may give a small disparity more weight (because outdoor objects are far away), but may give large a disparity more weight for an indoor scenario. The CVA module may refine the matching cost volume in either a multi-branch way or a single-branch way.

The cost aggregation module aggregates the attention-aware cost volume to output a disparity map from each network. Thereafter, the disparity fusion module fuses the aggregated disparities from each network (based on the different disparity ranges) to provide a final estimated disparity.

The feature extraction may be implemented using a conventional feature extraction backbone, such as ResNet, or stacked hourglass network. The inputs of feature extraction are left and right images, each having a size H×W, wherein H is height and W is width, and the outputs are the corresponding feature maps C×W×H for left and right images respectively, while C is the number of channels.

The cost volume may also be implemented using existing cost-volumes, such as a standard cost-volume based on feature map correlation, or an extended cost volume that integrates multiple cost volumes. The output of cost volume may be a four dimensional (4D) feature map C×D×H×W, wherein C is the number of channels, D is the disparity level, H is the height, and W is the width.

Regarding the CVA, because the cost volume is a 4D feature map, conventional attention algorithms based on a 3D feature map cannot be directly adopted. Accordingly, various embodiments are provided herein for performing the attention on the cost volume.

CVA Based On Multi-Branch Attention

A concept of multi-branch CVA is partitioning 4D feature maps $CV \in R^{(C \times D \times H \times W)}$ into several 3D feature maps, and then applying an attention mechanism on each 3D feature map. Below, two different methods are described for 4D to 3D partitioning, (a) partitioning along channel dimension of CV, i.e., channel-wise disparity attention on the cost volume (CVA-CWDA), and (b) partitioning along disparity dimension of CV, i.e., disparity-wise channel attention on the cost volume (CVA-DWCA).

Figure 3:
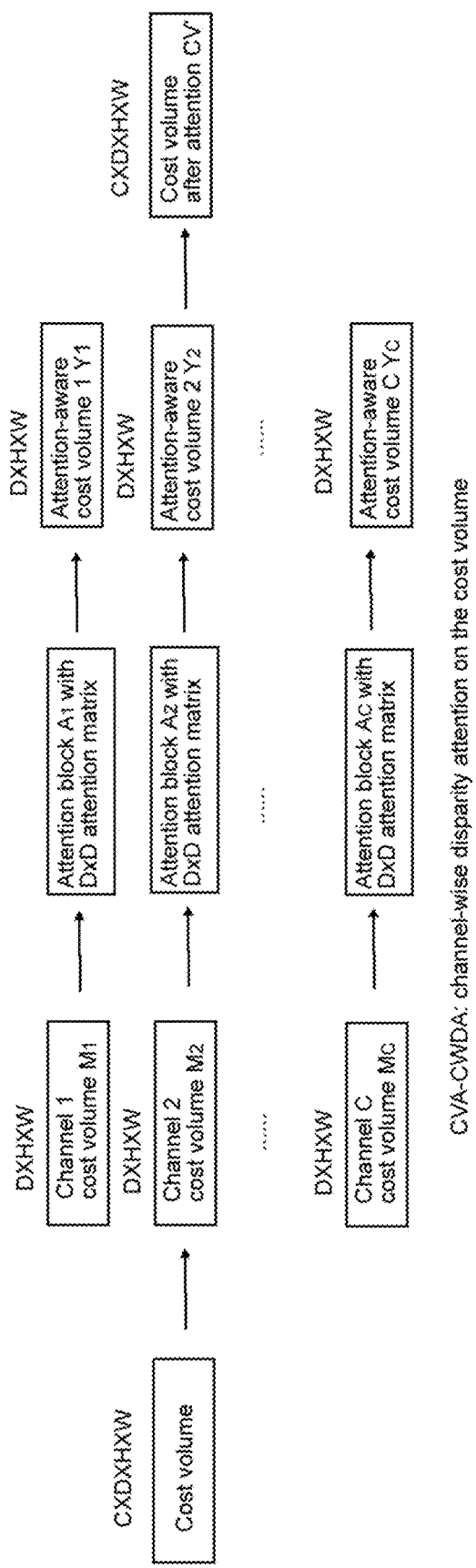
FIG. 3 illustrates a process of channel-wise disparity attention on the cost volume (CVA-CWDA), according to an embodiment.

FIG. 3 illustrates a process of CVA-CWDA, according to an embodiment. For example, the process of FIG. 3 may be performed by the CVA module 103 of FIG. 1.

In FIG. 3, M identifies a 3D map for each of the channels 1 though C of the cost volume. Y is the output attention-based cost volume corresponding to M. The attention map is D×D, which is able to show different attention on disparity for different datasets.

Referring to FIG. 3, a 4D feature map is partitioned into C 3D feature maps, each with size D×H×W (labeled as M). Specifically, a 4D feature map $CV \in R^{(C \times D \times H \times W)}$ is partitioned along channel dimension of CV, resulting in 3D feature maps $CV=\{M_1, \ldots, M_C\}$, $M_i \in R^{(D \times H \times W)}$, $1 \le i \le C$.

Thereafter, channel attention is applied to each of the C feature maps at attention blocks $A_1$ to $A_C$ to obtain the attention-aware feature map $Y_i \in R^{(D \times H \times W)}$. The attention may be calculated along the disparity dimension for each of $Y_i$, which results in a D×D attention matrix.

The attention-aware feature maps are then concatenated back to a 4D feature map $CV'=\{Y_1, Y_2, \ldots, Y_C\}$ as the output of the CVA module.

Figure 4:
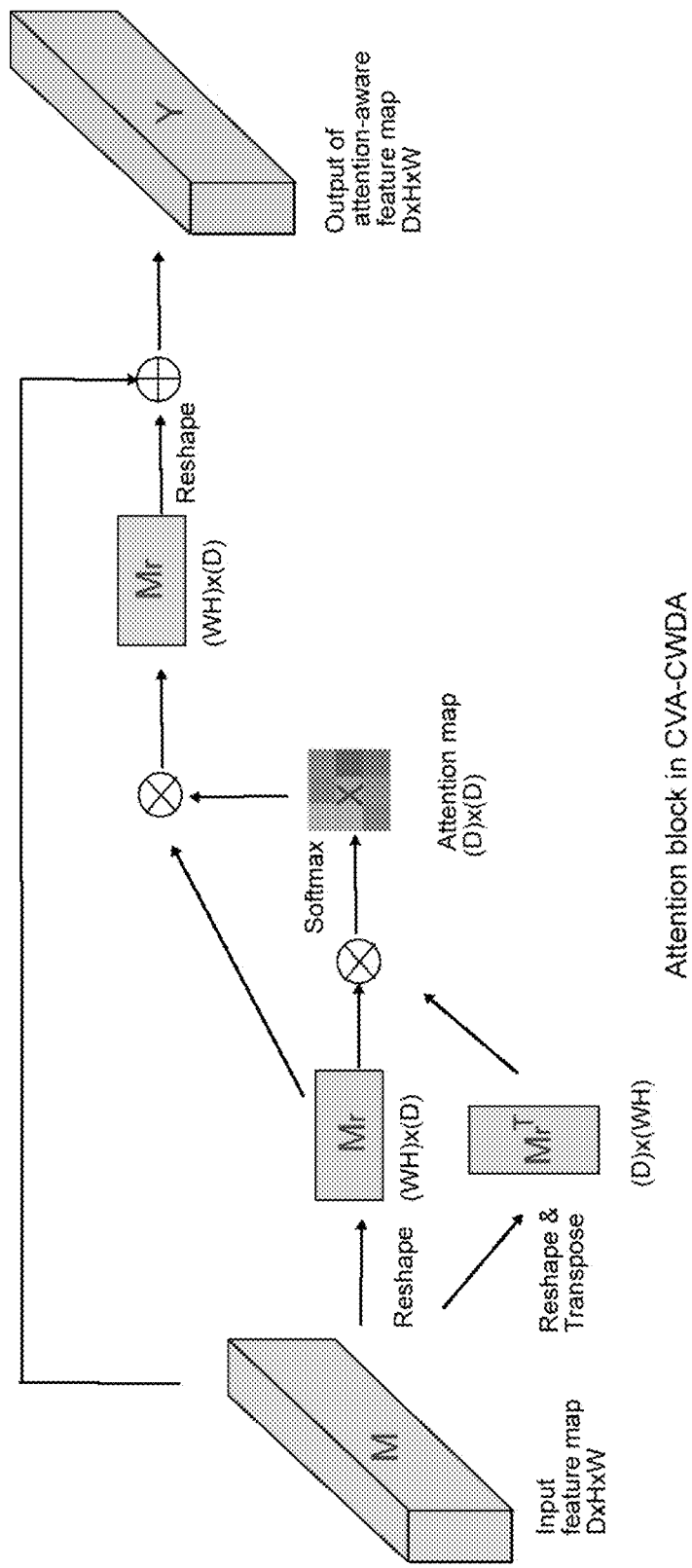
FIG. 4 illustrates a detailed process of an attention block in CVA-CWDA, according to an embodiment.

FIG. 4 illustrates a detailed process of an attention block in CVA-CWDA, according to an embodiment.

Referring to FIG. 4, an attention block reshapes a D×H×W map M into a reshaped (WH)×D map $M_r$ and a reshaped and transposed D×(WH) map $M_r^T$. $M_r$ and $M_r^T$ are then multiplied and a softmax is adopted to obtain a D×D attention map, i.e., an attention matrix $X \in R^{(D \times D)}$, which is then multiplied by $M_r$, reshaped to 4D, and then added to M in order to output a D×H×W attention-aware feature map Y.

Figure 5:
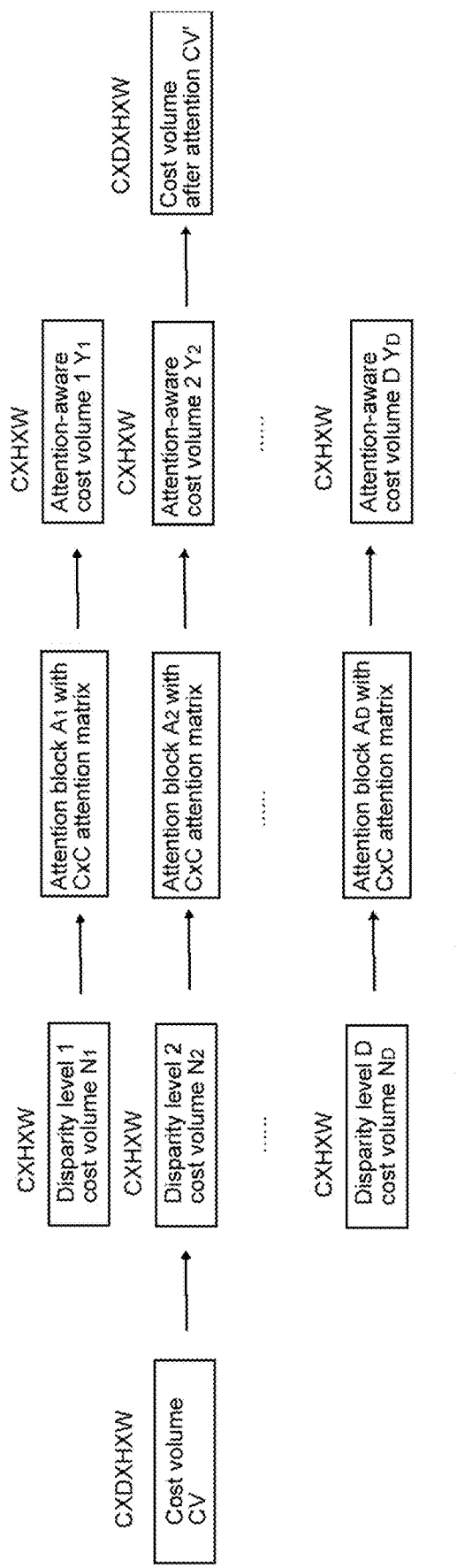
FIG. 5 illustrates a process of disparity-wise channel attention on the cost volume (CVA-DWCA), according to an embodiment.

FIG. 5 illustrates a process of CVA-DWCA, according to an embodiment. For example, the process of FIG. 5 may be performed by the CVA module 103 of FIG. 1.

In FIG. 5, N identifies a 3D map for each of the disparity levels 1 though D of the cost volume. Y is the output attention-based cost volume corresponding to N. The attention map is C×C, which is able to show different attention on disparity for different channels of cost volumes.

Referring to FIG. 5, a 4D feature map is partitioned into D 3D feature maps, each with size C×H×W (labeled as N). Specifically, a 4D feature map $CV \in R^{(C \times D \times H \times W)}$ is partitioned along channel dimension of CV, resulting in 3D feature maps $CV=\{N_1, \ldots, N_D\}$, $N_i \in R^{(C \times H \times W)}$, $1 \le i \le D$.

Thereafter, channel attention is applied to each of the D feature maps at attention blocks $N_1$ to $N_D$ to obtain the attention-aware feature map $Y_i \in R^{(C \times H \times W)}$. The attention may be calculated along the channel dimension for each of $Y_i$, which results in a C×C attention matrix. The attention-aware feature maps are then concatenated back to a 4D feature map $CV'=\{Y_1, Y_2, \ldots, Y_D\}$ as the output of the CVA module.

Figure 6:
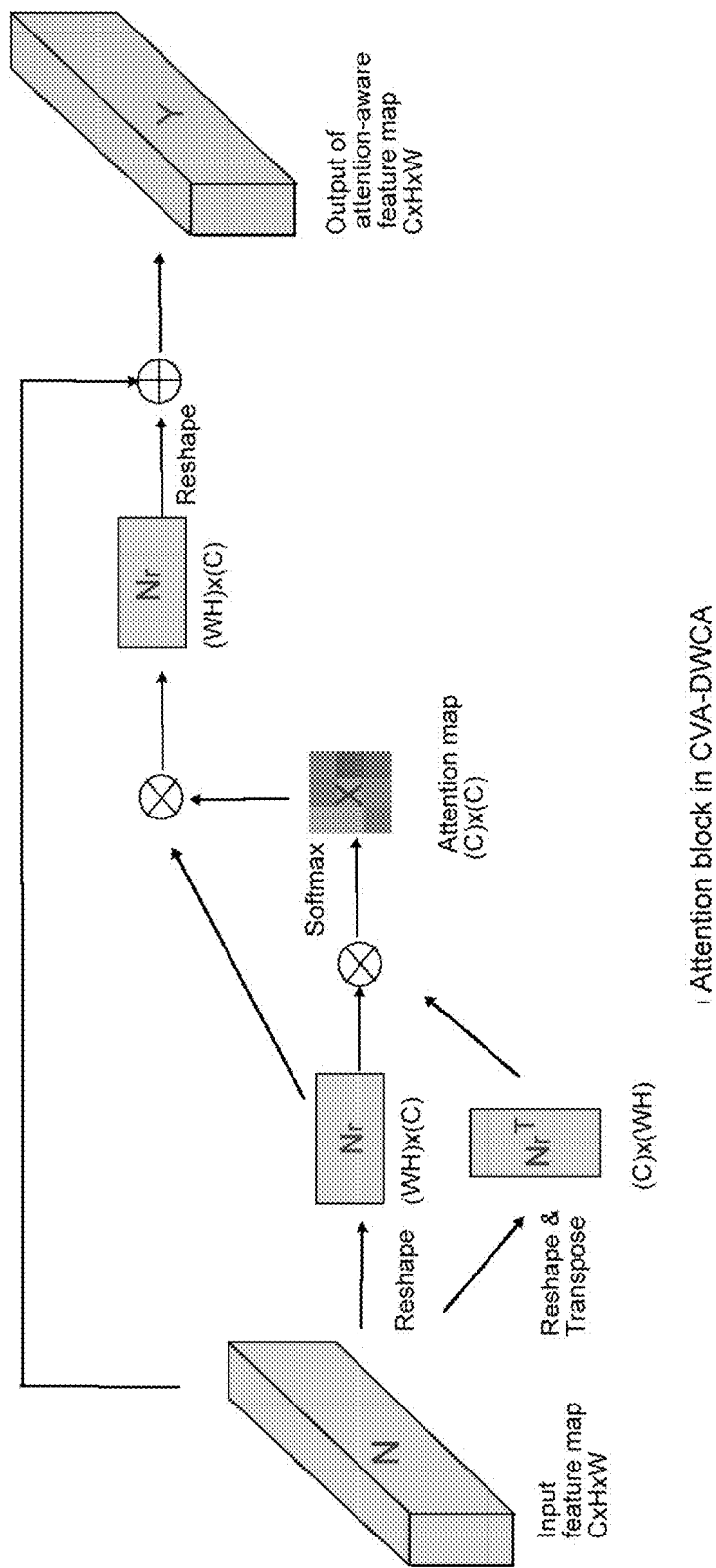
FIG. 6 illustrates a detailed process of an attention block in CVA-DWCA, according to an embodiment.

FIG. 6 illustrates a detailed process of an attention block in CVA-DWCA, according to an embodiment.

Referring to FIG. 6, an attention block reshapes a C×H×W map N into a reshaped (WH)×C map $N_r$ and a reshaped and transposed C×(WH) map $N_r^T$. $N_r$ and $N_r^T$ are then multiplied and a softmax is adopted to obtain a C×C attention map, i.e., an attention matrix $X \in R^{(C \times C)}$, which is then multiplied by $N_r$, reshaped to 4D, and then added to N in order to output a C×H×W attention-aware feature map Y.

In the above-described embodiments, the CVA-CWDA and CVA-DWCA modules capture different information. More specifically, CVA-CWDA tries to find a correlation between different disparity levels. For example, if the input image is a close-view indoor scenario, CVA-CWDA may emphasize the cost volume with a large disparity level. However, if the input image is an outdoor scenario, CVA-CWDA may emphasize the cost volume with small disparity level.

CVA-DWCA focuses on a correlation between different channels of the cost volume, which may be useful when the cost volume consists of multiple types of information, such as the extended cost volume in AMNet. When the cost volume consists of feature map correlation and differences, CVA-DWCA may revise which kind of information used in cost volume is better for a specific image.

CVA Based on Single-Branch Attention

A concept of single-branch CVA is directly working on the 4D cost volume. Before calculating an attention matrix, high-dimensional feature maps are "flattened" into low-dimensional feature maps. This is achieved by a one-shot attention module, where the input cost volume are flattened into 2D feature maps.

Below, four different methods are provided for flattening the high-dimensional feature maps for attention calculation, (a) CVA-SBDA, (b) CVA-SBCA, (c) CVA-SBCDCA, and (d) CVA-SBSA.

Figure 7:
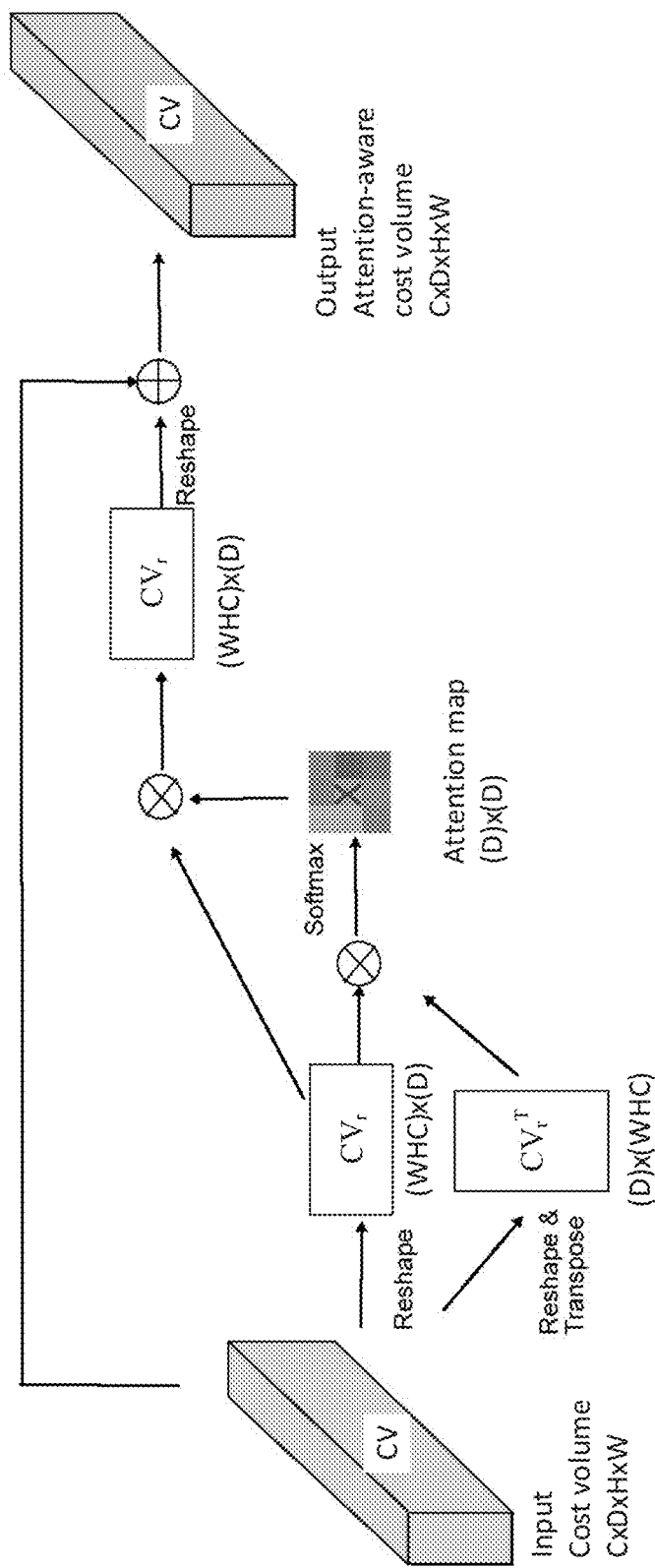
FIG. 7 illustrates a process of single-branch disparity attention on the cost volume (CVA-SBDA), according to an embodiment.

FIG. 7 illustrates a process of CVA-SBDA, according to an embodiment.

Referring to FIG. 7, the input to the CVA-SBDA is a 4D feature map $CV \in R^{(C \times D \times H \times W)}$. CV is reshaped into a 2D (WHC)×(D) map $CV_r \in R^{((CWH) \times D)}$ and reshaped and transposed into a 2D (D)×(WHC) map $CV_r^T \in R^{(D \times (CWH))}$. $CV_r$ and $CV_r^T$ are multiplied and a softmax is adopted in order to obtain an attention matrix $X \in R^{(D \times D)}$. The D×D attention matrix X is multiplied with $CV_r$, reshaped to 4D, and then added to CV in order to output an attention-aware cost volume $CV' \in R^{(C \times D \times H \times W)}$.

Figure 8:
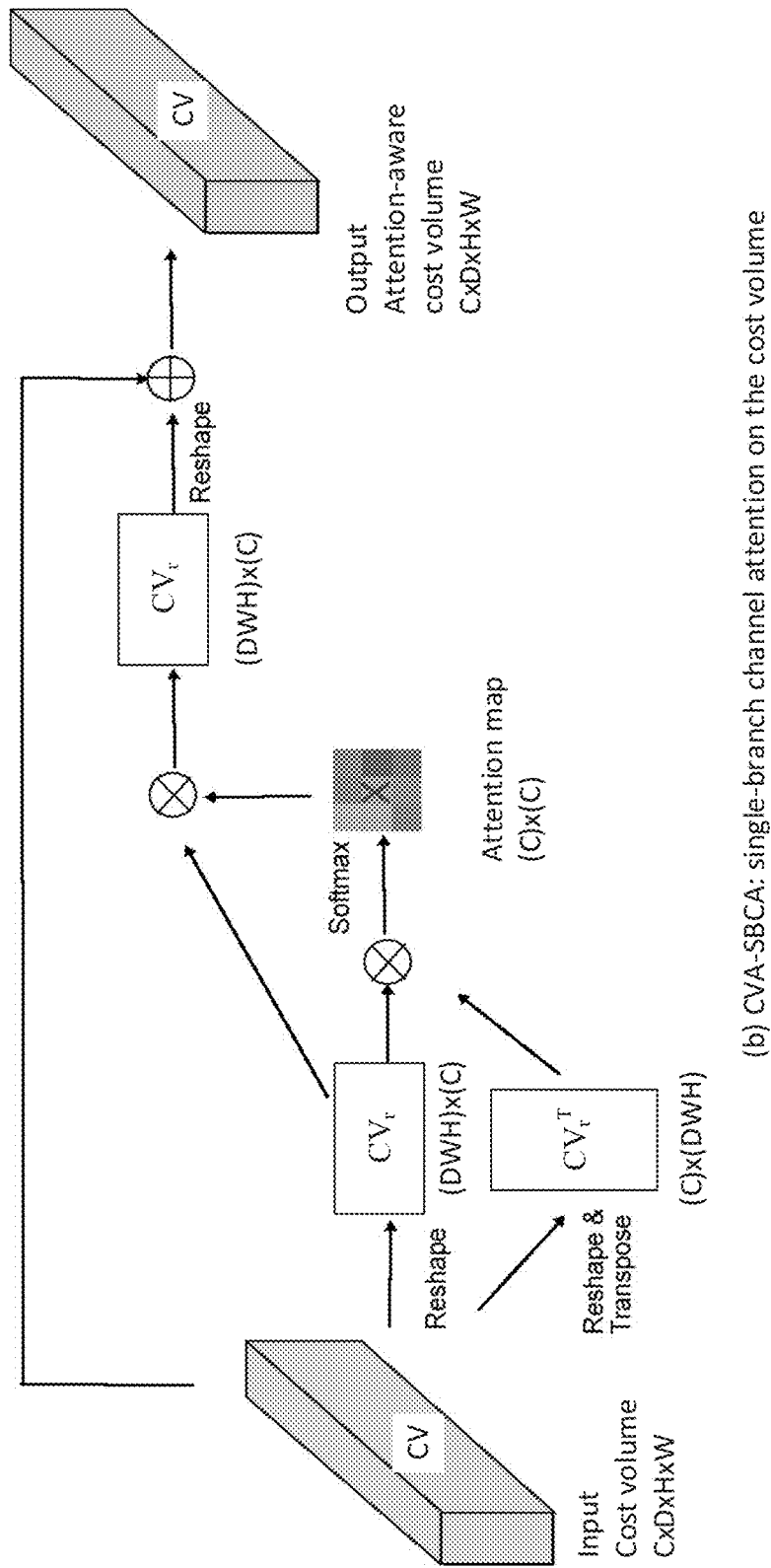
FIG. 8 illustrates a process of single-branch channel attention on the cost volume (CVA-SBCA), according to an embodiment.

FIG. 8 illustrates a process of single-branch channel attention on the cost volume (CVA-SBCA), according to an embodiment.

Referring to FIG. 8, the input to the CVA-SBCA is a 4D feature map $CV \in R^{(C \times D \times H \times W)}$. CV is reshaped into a 2D (DWH)×(C) map $CV_r \in R^{((DWH) \times C)}$ and reshaped and transposed into a 2D (C)×(DWH) map $CV_r^T \in R^{(C \times (DWH))}$. $CV_r$ and $CV_r^T$ are multiplied and a softmax is adopted in order to obtain an attention matrix $X \in R^{(C \times C)}$. The C×C attention matrix X is multiplied with $CV_r$, reshaped to 4D, and then added to CV in order to output an attention-aware cost volume $CV' \in R^{(C \times D \times H \times W)}$.

Figure 9:
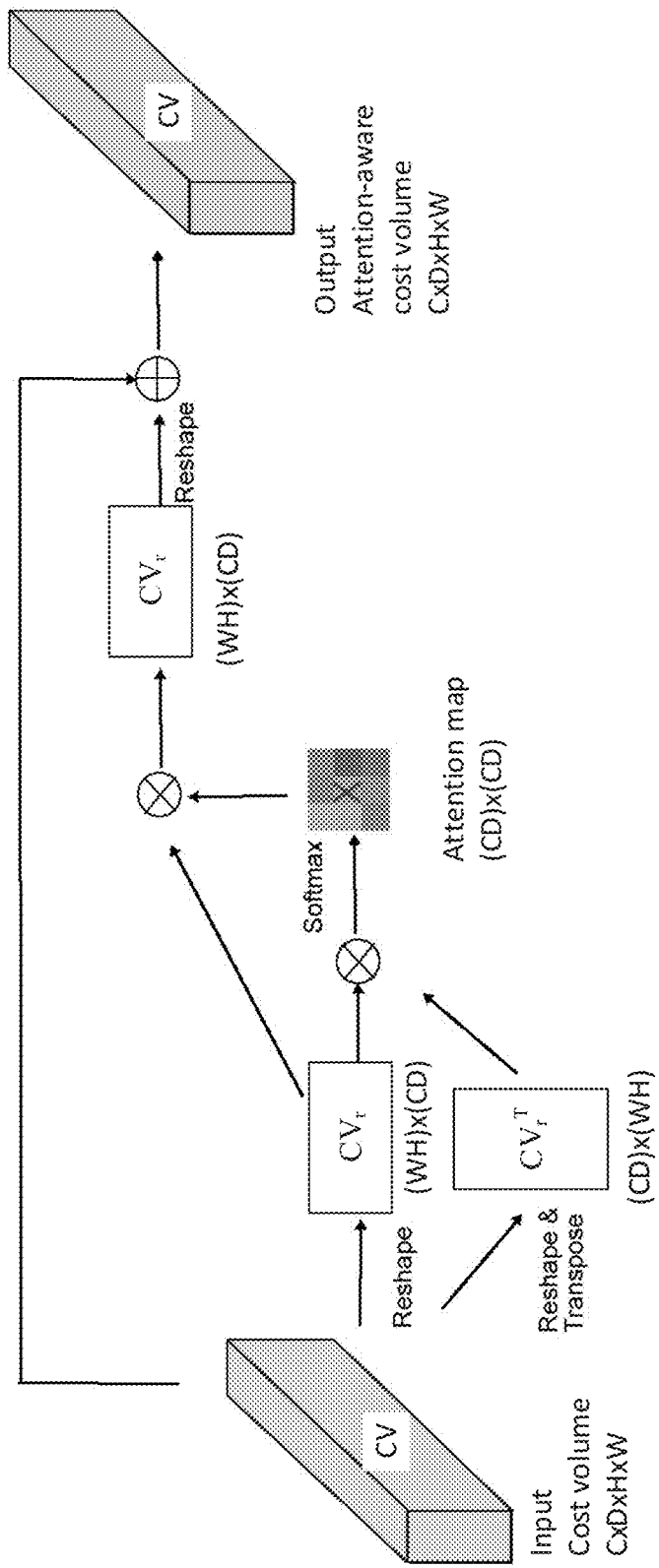
FIG. 9 illustrates a process of single-branch combined disparity-channel attention on the cost volume (CVA-SBCDCA), according to an embodiment.

FIG. 9 illustrates a process of single-branch combined disparity-channel attention on the cost volume (CVA-SBCDCA), according to an embodiment.

Referring to FIG. 9, the input to the CVA-SBCDCA is a 4D feature map $CV \in R^{(C \times D \times H \times W)}$. CV is reshaped into a 2D (WH)×(CD) map $CV_r \in R^{((WH) \times (CD))}$ and reshaped and transposed into a 2D (CD)×(WH) map $CV_r^T \in R^{((CD) \times (WH))}$. $CV_r$ and $CV_r^T$ are multiplied and a softmax is adopted in order to obtain an attention matrix $X \in R^{((CD) \times (CD))}$. The CD×CD attention matrix X is multiplied with $CV_r$, reshaped to 4D, and then added to CV in order to output an attention-aware cost volume $CV' \in R^{(C \times D \times H \times W)}$.

Figure 10:
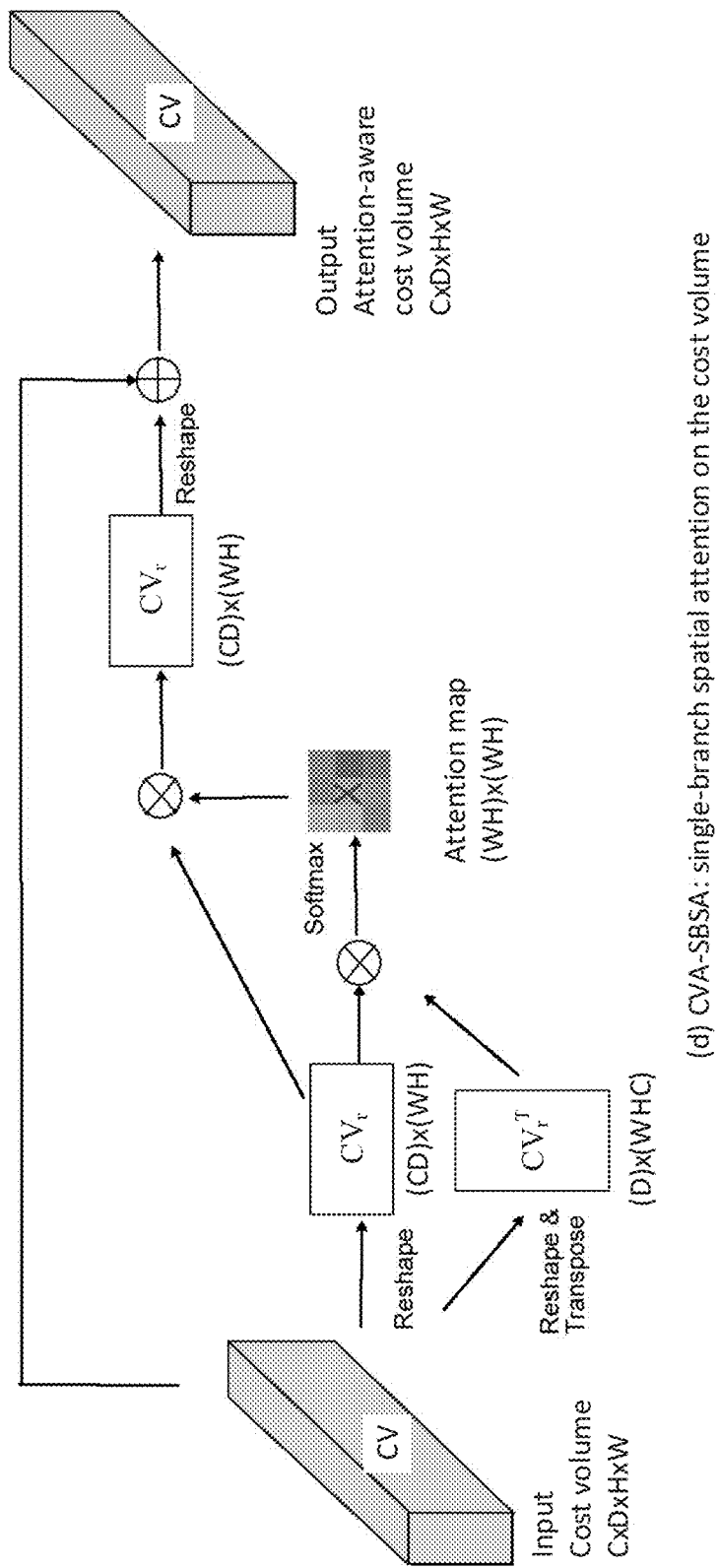
FIG. 10 illustrates a process of single-branch spatial attention on the cost volume (CVA-SBSA), according to an embodiment.

FIG. 10 illustrates a process of single-branch spatial attention on the cost volume (CVA-SBSA), according to an embodiment.

Referring to FIG. 10, the input to the CVA-SBSA is a 4D feature map $CV \in R^{(C \times D \times H \times W)}$. CV is reshaped into a 2D (CD)×(WH) map $CV_r \in R^{((CD) \times (WH))}$ and reshaped and transposed into a 2D (WH)×(CD) map $CV_r^T \in R^{((WH) \times (CD))}$. $CV_r$ and $CV_r^T$ are multiplied and a softmax is adopted in order to obtain an attention matrix $X \in R^{((WH) \times (WH))}$. The WH×WH attention matrix X is multiplied with $CV_r$, reshaped to 4D, and then added to CV in order to output an attention-aware cost volume $CV' \in R^{(C \times D \times H \times W)}$.

In comparing the above-described embodiments, CVA-SBDA and CVA-SBCA have same size attention matrices as CVA-CWDA and CVA-DWCA, but their attention matrices are calculated from all of the channels of the cost volume, instead of the multi-branch CVAs, where the attention matrices are calculated per channel. Since the size of the attention matrices does not change, their computational costs are similar.

CVA-SBCDCA has attention matrix with size CD×CD, which is a kind of combined attention between the disparity level and channel, but results in much higher computational cost.

CVA-SBSA has attention matrix with size WH×WH, which is a kind of spatial attention, which also has higher computational cost.

Dual Cost Volume Attention

A concept of dual cost volume attention may utilize any two of the above-described CVA modules. As the dual attention is constructed by using two CVA modules together, sequential ordering or parallel ordering may be utilized.

Figure 11:
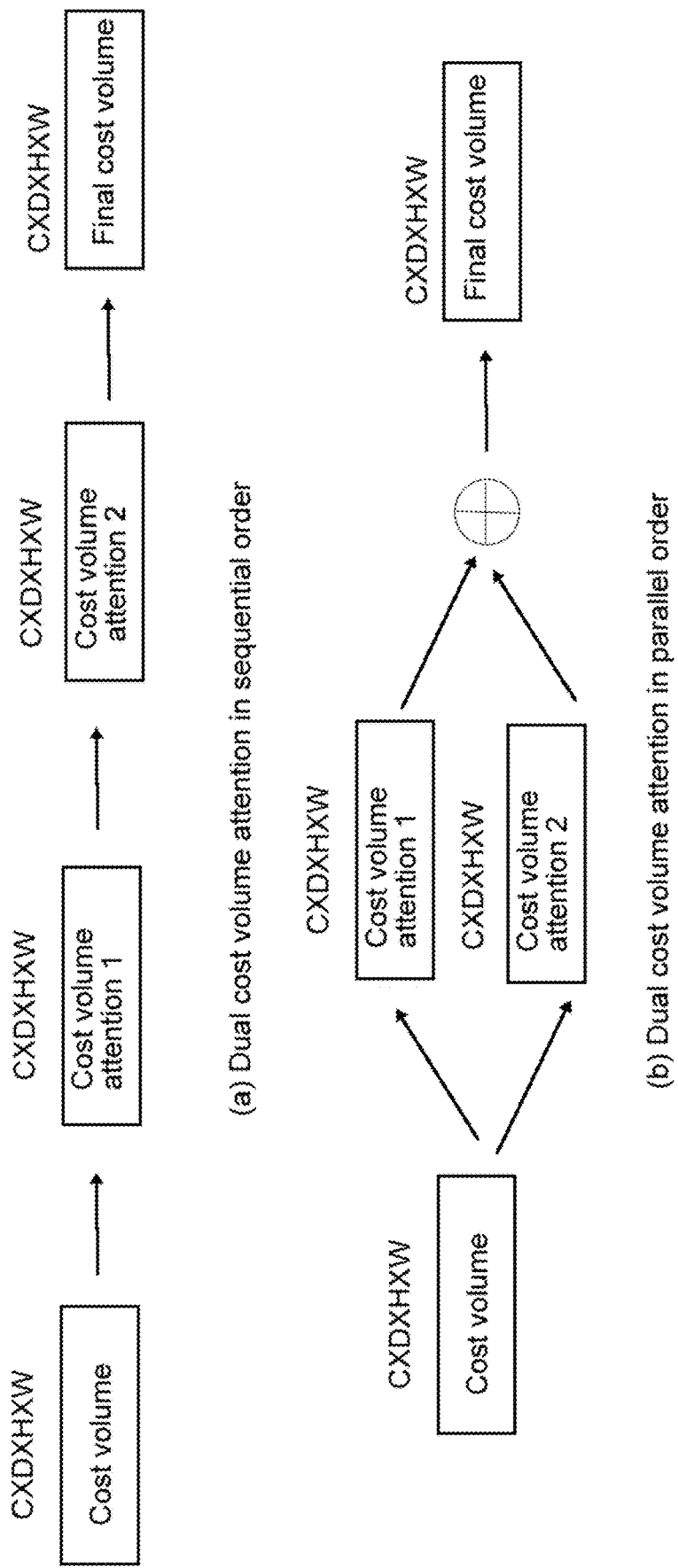
FIG. 11 illustrates a process of dual cost volume attention utilizing sequential ordering and parallel ordering, according to embodiment.

FIG. 11 illustrates a process of dual cost volume attention utilizing sequential ordering and parallel ordering, according to embodiment.

Referring to FIG. 11, in sequential ordering flow (a), two CVA modules are used utilized in series, and in parallel ordering flow (b), two CVA modules are used utilized in parallel and the results thereof are combined to provide a final cost volume estimate. Since the different attention matrices capture different information, dual cost volume attention may be utilized, as illustrated in FIG. 11, by organizing CVAs in either a sequential order or a parallel order.

Cost Aggregation

A cost aggregation module will output a disparity map by inputting attention-aware cost volume. It may be implemented by any existing cost aggregation modules, such as the semi-global like cost aggregation in Guided Aggregation Net (GANet) as illustrated by components 101, 102, and 104 of FIG. 1, or a stacked atrous multi-scale (AM) as illustrated by components 101, 102, 104 of FIG. 1.

Disparity Fusion

To further improve the accuracy and robustness, two networks may be trained on different disparity ranges. Both of these two networks may use the same feature extraction/cost volume/cost attention/cost aggregation, but use different maximum disparity ranges.

For example, the two networks (CVANets) may be based on two commonly-used backbones, AMNet and GANet.

AMNet uses a depthwise separable version of ResNet-50 as feature extractor, followed by an AM module, which captures deep global contextual information at multiple scales. An extended cost volume (ECV) that simultaneously computes different cost matching metrics may be adopted for cost aggregation. The output of ECV may be processed by a stacked AM module to output the final disparity.

GANet implements a feature extractor by an hourglass network and uses feature map correlation as cost volume. GANet designs a semi-global guided aggregation (SGA) layer that implements a differentiable approximation of semi-global matching and aggregates the matching cost in different directions over the whole image. This allows for accurate estimation on occluded and reflective regions.

More specifically, a first CVANet is trained on a disparity range [0, a], and outputs a first disparity map $D_1 = \Sigma_{i=1}^{a} i P_{1,i}$, where $P_{1,i}$ is the probability of a pixel having estimated disparity equal to i when i<a, and $P_{1,i}$ is the probability of a pixel having estimated disparity greater than or equal to a when i=a.

A second CVANet is trained on the full disparity range [0,b], where a<b, and outputs a second disparity map $D_2 = \Sigma_{i=1}^{b} i P_{2,i}$, where $P_{2,i}$ is the probability of a pixel having estimated disparity equal to i when i<b, and $P_{2,i}$ is the probability of a pixel having estimated disparity greater than or equal to b when i=b.

$D_1$ and $D_2$ may be fused using a disparity combining based on $D_1$ and $D_2$ directly, or a soft combining (or probability combining) that utilizes the probability vectors $P_{1,i}$, $P_{2,i}$.

When disparity combining the final output disparity $D_{fused}$ may be obtained as a simple weighted sum as follows:

$$D_1 = \sum_{i=1}^{a} i \times P_{1,i}$$

$$D_2 = \sum_{i=1}^{b} i \times P_{2,i}$$

$$D_{fused} = \begin{cases} w_1 D_1 + w_2 D_2 & D_1 \text{ and } D_2 < a \\ D_2 & \text{else} \end{cases}$$

w1 and w2 are constants laying between [0,1]. Set by validation results.

When soft combining, the fusion occurs on the probability vectors, where w1, w2, and w3 are constants laying between [0,1], as follows:

$$P_{fused,i} = \begin{cases} w_1 P_{1,i} + w_2 P_{2,i} & i < a \\ w_3 P_{2,i} & i \geq a \end{cases}$$

$P_{fused,i}$ should be further normalized as $$P_{fused,i} = \frac{P_{fused,i}}{\sum_{j=1}^{b} P_{fused,j}}.$$

output based on soft combining may be represented by:

$$D_{fused} = \sum_{i=1}^{b} i \times P_{fused,i}$$

Using a single model, the above-described procedure may generate reasonable disparity outputs for both indoor and outdoor scenarios.

Accuracy and efficiency (AE) comparison of CVANets with different attention modules are provided below in Table 1, which shows that the multi-branch attention modules generally have better accuracy/efficiency than single-branch attention modules.

TABLE 1

| Network | CVA module | Branch | Complexity | AE |
|---|---|---|---|---|
| AMNet | N/A | N/A | N/A | 0.6499 |
| CVANet-AMNet | CWDA | Multi | $O(CD^3HW)$ | 0.6299 |
| CVANet-AMNet | DWCA | Multi | $O(C^3DHW)$ | 0.6277 |
| CVANet-AMNet | SBDA | Single | $O(CD^3HW)$ | 0.6378 |
| CVANet-AMNet | SBCA | Single | $O(C^3DHW)$ | 0.6369 |
| CVANet-AMNet | SBCDCA | Single | $O(C^3D^3HW)$ | 0.6299 |
| CVANet-AMNet | SBSA | Single | $O(CDH^3W^3)$ | 0.6451 |
| GANet | N/A | N/A | N/A | 0.6493 |
| CVANet-AMNet | CWDA | Multi | $O(CD^3HW)$ | 0.6259 |
| CVANet-AMNet | DWCA | Multi | $O(C^3DHW)$ | 0.6277 |
| CVANet-AMNet | SBDA | Single | $O(C^3DHW)$ | 0.6370 |
| CVANet-AMNet | SBCA | Single | $O(C^3DHW)$ | 0.6380 |
| CVANet-AMNet | SBCDCA | Single | $O(C^3D^3HW)$ | 0.6274 |
| CVANet-AMNet | SBSA | Single | $O(CDH^3W^3)$ | 0.6441 |

An attention map also shows that for images with different scenarios, the above-described cost-volume attention modules work well.

Figure 12:
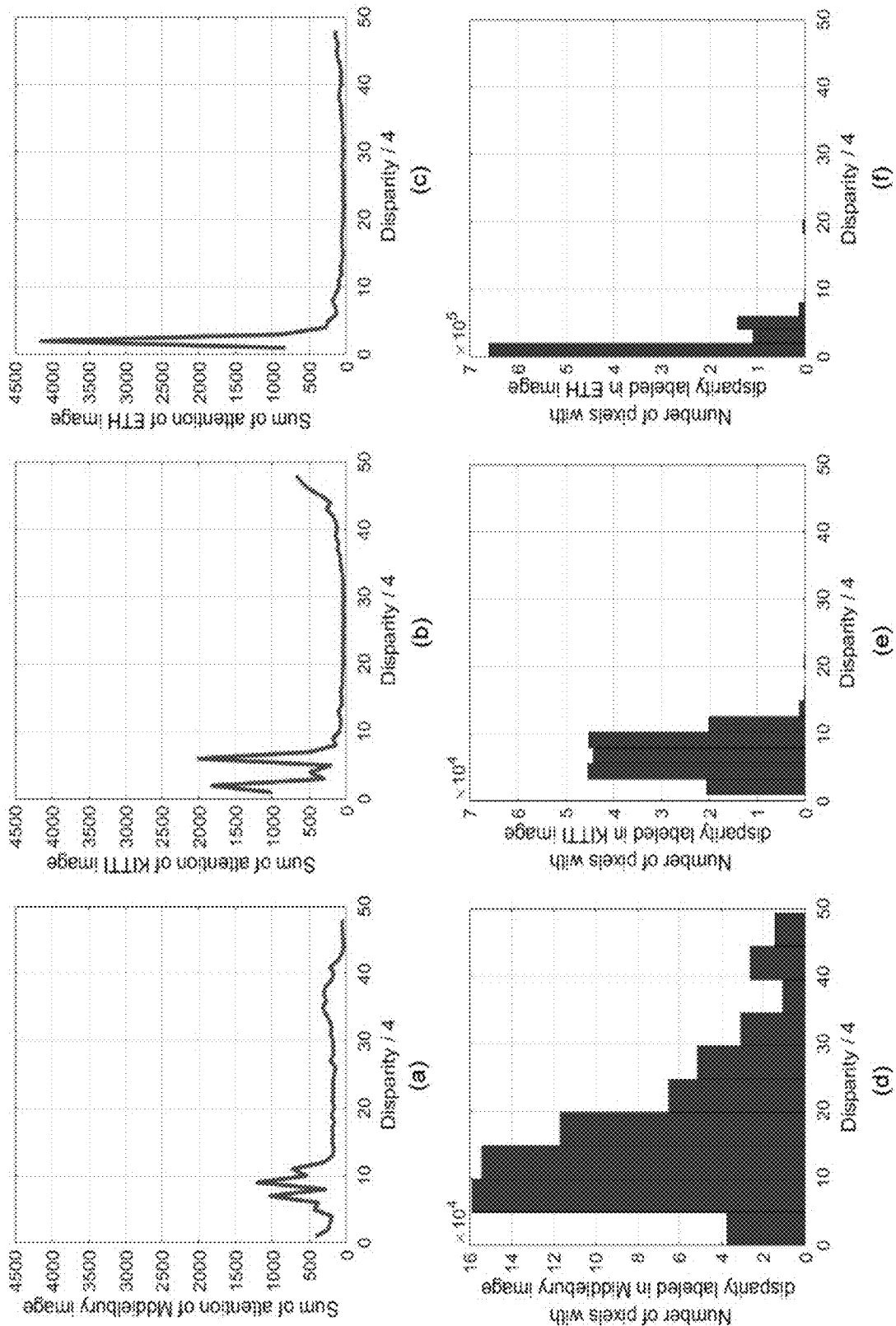
FIG. 12 illustrates graphs demonstrating effectiveness of cost-volume attention modules, according to an embodiment.

FIG. 12 illustrates graphs demonstrating effectiveness of cost-volume attention modules, according to an embodiment.

Referring to FIG. 12, to demonstrate the effectiveness of the above-described techniques, graphs (a) to (c) in the top row show column-wise sum of values the attention matrices (D×D), which provide consistent patterns as the disparity distribution in graphs (d) to (f) in the bottom row 13.

Figure 13:
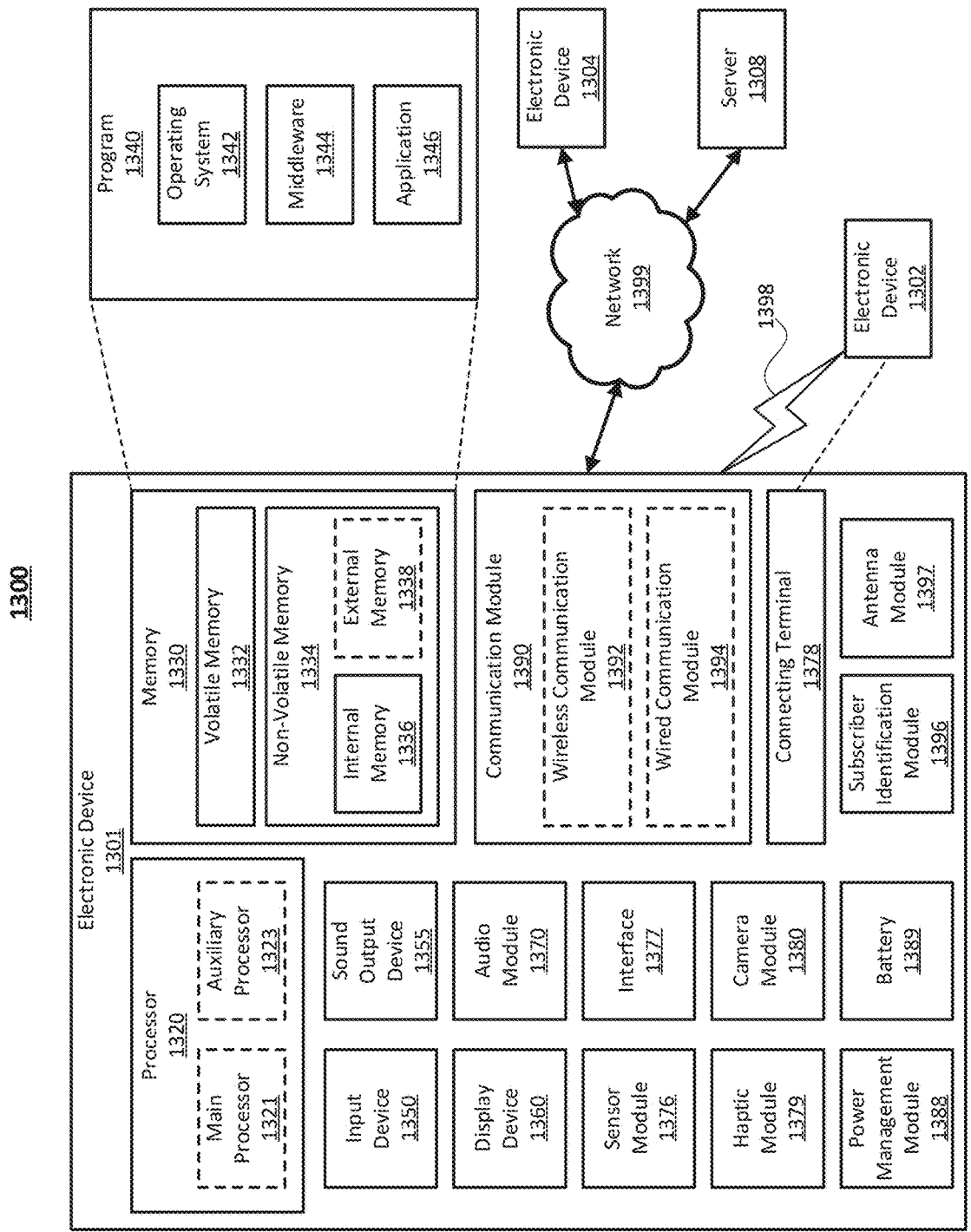
FIG. 13 illustrates an electronic device in a network environment, according to an embodiment.

FIG. 13 illustrates a block diagram of an electronic device in a network environment, according to one embodiment.

Referring to FIG. 13, the electronic device 1301 in the network environment 1300 may communicate with an electronic device 1302 via a first network 1398 (e.g., a short-range wireless communication network), or an electronic device 1304 or a server 1308 via a second network 1399 (e.g., a long-range wireless communication network). The electronic device 1301 may communicate with the electronic device 1304 via the server 1308. The electronic device 1301 may include a processor 1320, a memory 1330, an input device 1350, a sound output device 1355, a display device 1360, an audio module 1370, a sensor module 1376, an interface 1377, a haptic module 1379, a camera module 1380, a power management module 1388, a battery 1389, a communication module 1390, a subscriber identification module (SIM) 1396, or an antenna module 1397. In one embodiment, at least one (e.g., the display device 1360 or the camera module 1380) of the components may be omitted from the electronic device 1301, or one or more other components may be added to the electronic device 1301. In one embodiment, some of the components may be implemented as a single integrated circuit (IC). For example, the sensor module 1376 (e.g., a fingerprint sensor, an iris sensor, or an illuminance sensor) may be embedded in the display device 1360 (e.g., a display).

The processor 1320 may execute, for example, software (e.g., a program 1340) to control at least one other component (e.g., a hardware or a software component) of the electronic device 1301 coupled with the processor 1320, and may perform various data processing or computations. As at least part of the data processing or computations, the processor 1320 may load a command or data received from another component (e.g., the sensor module 1376 or the communication module 1390) in volatile memory 1332, process the command or the data stored in the volatile memory 1332, and store resulting data in non-volatile memory 1334. The processor 1320 may include a main processor 1321 (e.g., a central processing unit (CPU) or an application processor (AP)), and an auxiliary processor 1323 (e.g., a graphics processing unit (GPU), an image signal processor (ISP), a sensor hub processor, or a communication processor (CP)) that is operable independently from, or in conjunction with, the main processor 1321. Additionally or alternatively, the auxiliary processor 1323 may be adapted to consume less power than the main processor 1321, or execute a particular function. The auxiliary processor 1323 may be implemented as being separate from, or a part of, the main processor 1321.

The auxiliary processor 1323 may control at least some of the functions or states related to at least one component (e.g., the display device 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to one embodiment, the auxiliary processor 1323 (e.g., an image signal processor or a communication processor) may be implemented as part of another component (e.g., the camera module 1380 or the communication module 1390) functionally related to the auxiliary processor 1323.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input device 1350 may receive a command or data to be used by another component (e.g., the processor 1320) of the electronic device 1301, from the outside (e.g., a user) of the electronic device 1301. The input device 1350 may include, for example, a microphone, a mouse, or a keyboard.

The sound output device 1355 may output sound signals to the outside of the electronic device 1301. The sound output device 1355 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 1360 may visually provide information to the outside (e.g., a user) of the electronic device 1301. The display device 1360 may include, for example, a display, a hologram device, or a projector and control circuitry to control a corresponding one of the display, hologram device, and projector. According to one embodiment, the display device 1360 may include touch circuitry adapted to detect a touch, or sensor circuitry (e.g., a pressure sensor) adapted to measure the intensity of force incurred by the touch.

The audio module 1370 may convert a sound into an electrical signal and vice versa. According to one embodiment, the audio module 1370 may obtain the sound via the input device 1350, or output the sound via the sound output device 1355 or a headphone of an external electronic device 1302 directly (e.g., wired) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. The sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device 1302 directly (e.g., wired) or wirelessly. According to one embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device 1302. According to one embodiment, the connecting terminal 1378 may include, for example, an HDMI connector, a USB connector, an SD card connector, or an audio connector (e.g., a headphone connector).

The haptic module 1379 may convert an electrical signal into a mechanical stimulus (e.g., a vibration or a movement) or an electrical stimulus which may be recognized by a user via tactile sensation or kinesthetic sensation. According to one embodiment, the haptic module 1379 may include, for example, a motor, a piezoelectric element, or an electrical stimulator.

The camera module 1380 may capture a still image or moving images. According to one embodiment, the camera module 1380 may include one or more lenses, image sensors, image signal processors, or flashes.

The power management module 1388 may manage power supplied to the electronic device 1301. The power management module 1388 may be implemented as at least part of, for example, a power management integrated circuit (PMIC).

The battery 1389 may supply power to at least one component of the electronic device 1301. According to one embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the AP) and supports a direct (e.g., wired) communication or a wireless communication. According to one embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or a standard of the Infrared Data Association (IrDA)) or the second network 1399 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The antenna module 1397 may transmit or receive a signal or power to or from the outside (e.g., the external electronic device) of the electronic device 1301. According to one embodiment, the antenna module 1397 may include one or more antennas, and, therefrom, at least one antenna appropriate for a communication scheme used in the communication network, such as the first network 1398 or the second network 1399, may be selected, for example, by the communication module 1390 (e.g., the wireless communication module 1392). The signal or the power may then be transmitted or received between the communication module 1390 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 1301 and the external electronic device 1304 via the server 1308 coupled with the second network 1399. Each of the electronic devices 1302 and 1304 may be a device of a same type as, or a different type, from the electronic device 1301. All or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, or client-server computing technology may be used, for example.

One embodiment may be implemented as software (e.g., the program 1340) including one or more instructions that are stored in a storage medium (e.g., internal memory 1336 or external memory 1338) that is readable by a machine (e.g., the electronic device 1301). For example, a processor of the electronic device 1301 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising:
    extracting first feature maps from left images captured by a first camera;
    extracting second feature maps from right images captured by a second camera;
    calculating a matching cost based on a comparison of the first and second feature maps to generate a cost volume;
    generating an attention-aware cost volume from the generated cost volume; and
    aggregating the attention-aware cost volume to generate an output disparity, wherein generating the attention-aware cost volume comprises assigning different weights for different disparity levels in the generated cost volume.

2. The method of claim 1, wherein generating the attention-aware cost volume further comprises:
partitioning a 4-dimensional (4D) map of the generated cost volume into D 3-dimensional (3D) maps, each of the 3D feature maps have a size C×H×W, where D represents a disparity level, C represents a number of channels, II represents height, and W represents width;
applying channel attention to each of the 3D feature maps to obtain the attention-aware feature maps; and
concatenating the attention-aware feature maps to a 4D feature map of the attention-aware cost volume.

3. The method of claim 2, wherein a C×C attention matrix is utilized to app the channel attention to each of the 3D feature maps.

4. The method of claim 1, wherein generating the attention-aware cost volume further comprises assigning different weights for different channels in the generated cost volume.

5. The method of claim 1, wherein generating the attention-aware cost volume further comprises:
partitioning a 4-dimensional (4D) map of the generated cost volume into C 3-dimensional (3D) maps, each of the 3D feature maps have a size D×H×W, where C represents a number of channels, D represents a disparity level, H represents height, and \V represents width;
applying channel attention to each of the 3D feature maps to obtain the attention-aware feature maps; and
concatenating the attention-aware feature maps to a 4D feature map of the attention-aware cost volume.

6. The method of claim 5, wherein a D×D attention matrix is utilized to apply the channel attention to each of the 3D feature maps.

7. The method of claim 1, wherein generating the attention-aware cost volume further comprises:
reshaping a 4-dimensional (4D) map of the generated cost volume having a size of C×D×H×W into a 2-dimensional (2D) map have a size (WHC)×D, where C represents a number of channels, D represents a disparity level, H represents height, and W represents width;
applying channel attention to the 2D feature map to obtain the attention-aware feature map; and
reshaping the attention-aware feature map into a 4D feature map of the attention-aware cost volume.

8. The method of claim 7, wherein a D×D attention matrix is utilized to apply the channel attention to the 2D feature map.

9. The method of claim 1, wherein generating the attention-aware cost volume further comprises:
reshaping a 4-dimensional (4D) map of the generated cost volume having a size of C×D×H×W into a 2-dimensional (2D) map have a size (DWH)×C, where C represents a number of channels, D represents a disparity level, H represents height, and W represents width;
applying channel attention to the 2D feature map to obtain the attention-aware feature map; and
reshaping the attention-aware feature map into a 4D feature map of the attention-aware cost volume.

10. The method of claim 9, wherein a C×C attention matrix is utilized to apply the channel attention to the 2D feature map.

11. The method of claim 1, wherein generating the attention-aware cost volume further comprises:
reshaping a 4-dimensional (4D) map of the generated cost volume having a size of C×D×H×W into a 2-dimensional (2D) map have a size WH×CD, where C represents a number of channels, D represents a disparity level, H represents height, and W represents width;
applying channel attention to the 2D feature map to obtain the attention-aware feature map; and
reshaping the attention-aware feature map into a 4D feature map of the attention-aware cost volume.

12. The method of claim 11, wherein a CD×CD attention matrix is utilized to apply the channel attention to the 2D feature map.

13. The method of claim 1, wherein generating the attention-aware cost volume further comprises:
reshaping a 4-dimensional (4D) map of the generated cost volume having a size of C×D×H×W into a 2-dimensional (2D) map have a size CD×WH, where C represents a number of channels; D represents a disparity level; H represents height, and W represents width;
applying channel attention to the 2D feature map to obtain the attention-aware feature map; and
reshaping the attention-aware feature map into a 4D feature map of the attention-aware cost volume.

14. The method of claim 13, wherein a WH×WH attention matrix is utilized to apply the channel attention to the 2D feature map.

15. The method of claim 1, further comprising fusing two or more aggregated disparities from different networks trained with different disparity ranges to provide a final output disparity.

16. The method of claim 15, further comprising training the two or more aggregated disparities on different disparity ranges, prior to fusing the two or more aggregated disparities.

17. A system, comprising:
a memory; and
a processor configured to:
extract first feature maps from left images captured by a first camera,
extract second feature maps from right images captured by a second camera,
calculate a matching cost based on a comparison of the first and second feature maps to generate a cost volume,
generate an attention-aware cost volume from the generated cost volume, and
aggregate the attention-aware cost volume to generate an output disparity,
wherein the processor is further configured to generate the attention-aware cost volume by assigning different weights for different disparity levels in the generated cost volume.

18. The system of claim 17, wherein the processor is further configured to generate the attention-aware cost volume by assigning different weights for different channels in the generated cost volume.

19. A system, comprising:
a feature extraction module configured to extract first feature maps from left images captured by a first camera, and extract second feature maps from right images captured by a second camera;
a cost volume calculation module configured to calculate a matching cost based on a comparison of the first and second feature maps to generate a cost volume;

a cost volume attention module configured to generate an attention-aware cost volume from the generated cost volume; and a cost aggregation module configured to aggregate the attention-aware cost volume to generate an output disparity, wherein the cost volume attention module is further configured to generate the attention-aware cost volume by assigning different weights for different disparity levels in the generated cost volume.

* * * * *